United States Patent [19]

Friedman, III

[11] Patent Number: 4,818,968

[45] Date of Patent: Apr. 4, 1989

[54] RARE GAS CONTROL SYSTEM

[76] Inventor: Harry Friedman, III, 9 Sewell Ave., Brookline, Mass. 02146

[21] Appl. No.: 67,129

[22] Filed: Jun. 29, 1987

Related U.S. Application Data

[63] Continuation-in-part of Ser. No. 818,261, Jan. 13, 1986, Pat. No. 4,682,146.

[51] Int. Cl.⁴ .............................................. B60Q 1/26
[52] U.S. Cl. ................................ 315/169.1; 340/468; 40/406; 40/545; 40/558; 315/169.4; 315/DIG. 7; 362/263
[58] Field of Search ..................... 340/77, 74, 105, 67, 340/82, 71–73, 83, 97, 331, 332, 775, 758, 718, 753, 771, 774, 779; 40/558, 544, 545, 406; 362/71, 217, 210, 229, 263, 265; 116/42; 315/169.1–169.4, DIG. 1–7

[56] References Cited

U.S. PATENT DOCUMENTS 3,440,488  4/1969  Skirvin ............................... 340/771

Primary Examiner—Donnie L. Crosland
Attorney, Agent, or Firm—Wolf, Greenfield & Sacks

[57] ABSTRACT

A system for controlling light propagation in a multiple tube display. Each tube has a pair of electrodes disposed at opposite positions, one of which is excited. Control means excites one of the electrodes of a first tube at a variable increasing power level to cause light intensity to sweep therethrough. A second control circuit controls excitation of one of the electrodes of the other tube to provide a variable increasing power level to cause light intensity to sweep therethrough.

43 Claims, 4 Drawing Sheets

RARE GAS CONTROL SYSTEM

RELATED APPLICATION

This application is a continuation in part of application Ser. No. 06/818,261 filed Jan. 13, 1986, now U.S. Pat. No. 4,682,146, granted July 21, 1987.

BACKGROUND OF THE INVENTION

1. Field of the Invention

The present invention relates in general to a rare gas control system, and pertains, more particularly, to a rare gas tubing network embodied for display purposes.

2. Background Discussion

My U.S. Pat. No. 4,682,146 describes an automotive indicator light system employing a rare gas tube. The indicator light system employs indicator lights specifically mounted at the rear of an automobile and are intended to communicate the various operational states of the automobile to persons behind the automobile.

Rare gas tube displays such as in the form of neon signs are typically used in advertising and artistic display fields. These signs are typically lit by applying a high voltage alternating current simultaneously to electrodes at either end of a sealed glass envelope containing a rare gas mixture. The ionizing voltage and current are typically produced by the 60 Hertz line current stepped up to an appropriate voltage by an electrical transformer. These signs are usually used in a continuous "on" state of operation. More complex displays utilize multiple tubes and may flash sequentially as controlled by appropriate switching circuitry. In such systems, switching is typically accomplished with the use of timers and mechanical switchers that periodically interrupt the flow of current through the tube in providing this flashing operation. The flashing operation is carried out by concurrent excitation of both electrodes of the tube.

It is an object of the present invention to provide an improved form of rare gas tube display employing a light sweeping effect for improved display aesthetics.

Another object of the present invention is to provide an improved rare gas indicator and display system employing multiple display tubes.

A further object of the present invention is to provide an improved rare gas indicator and display system as in accordance with the preceding object and in which a control means is provided for enabling sequential operation of the multiple rare gas tubes.

SUMMARY OF THE INVENTION

To accomplish the foregoing and other objects, features, and advantages of the invention, there is provided a rare gas control system that is comprised of a first envelope means, such as a rare gas tube for containing an excitable rare gas and having a pair of electrodes disposed at opposite positions in the first envelope means. There is also provided at least a second envelope means which also may be a rare gas tube for containing an excitable rare gas and having a pair of electrodes disposed at opposite positions in the second envelope means. Control means are provide including a first control means for controlling excitation of one of said electrodes of the first envelope means at a variable increasing power level to cause light intensity to sweep from the one electrode toward the other electrode. The control means also includes a second control means for controlling excitation of one of the electrodes of the second envelope means at a variable increasing power level to cause light intensity to sweep from this one electrode toward the other electrode.

In accordance with the invention, the control may be provided so as to excite the second envelope means only after a delay period after completion of an excitation of the first envelope means. Alternatively, the control can be carried out so that the second envelope means is excited directly upon completion of the excitation of the first envelope means. Still a further version of the invention is there may be an overlap in excitation so that the second envelope means is excited prior to the completion of excitation of the first envelope means.

In accordance with the present invention, the control is also carried out separately for each of the tubes so that, for example, the rate of excitation and thus the rate of light intensity sweep can be controlled. The tubes may be excited at different respective rates.

In the embodiment disclosed herein, there are actually four separate tubes. The second tube has its excitation commenced after a delay period from the end of excitation of the first tube. The third tube has its initiation of excitation concurrent with the completion of excitation of the second tube. The fourth tube is excited after a delay but is excited at a higher excitation rate than the first three tubes. Various other combinations are also possible.

More particularly, in accordance with the embodiment of the invention disclosed herein, the control circuitry includes separate control circuits associated with each of the tubes with each control circuit including an offset circuit for determining where in the voltage ramp control waveform the particular tube is to be excited. Each control circuit also includes a combining circuit for combining the offset signal with the ramp signal. The circuitry further includes a comparator for coupling the high frequency excitation signal to an output drive circuit associated with each tube. This output drive circuit may include a transformer.

BRIEF DESCRIPTION OF THE DRAWINGS

Numerous other objects, features, and advantages of the invention should now become apparent upon a reading of the following detailed description taken in conjunction with the accompanying drawings, in which.

DETAILED DESCRIPTION

Figure 1:
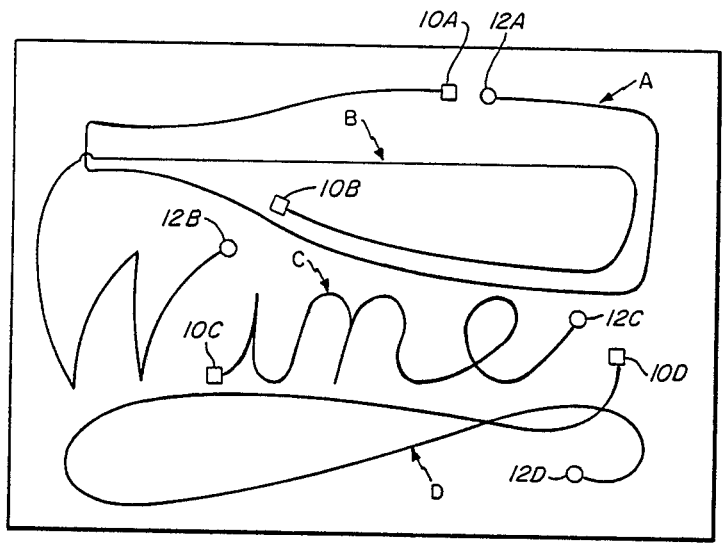
FIG. 1 schematically represents a display sign fabricated employing four separate rare gas tubes.

The present invention is now described in one particular embodiment illustrated in the form of the rare gas tube sign of FIG. 1. In accordance with the present invention, the excitation of the sign is controlled in accordance with a light intensity sweeping concept.

This controls the light propagation rate and relative timing in the rare gas tube network.

Now, with further reference to the particular embodiment of FIG. 1, it is noted that the sign is one that may be associated with liquor advertising and may be in the form of a neon sign for advertising wine for a liquor store. The sign is comprised of a tilted wine bottle shown at A. At B is illustrated an abstract of wine within the bottle along with the letter "W". At C is the designation "ine". At D is a tail flourish tracing an underlining of the sign. All four of these indicia, although shown in line form, are actually implemented by rare gas tubing. As illustrated in FIG. 1, this tubing is generally of an elongated shape having electrodes at either end thereof. Thus, associated with the neon tube A are the electrodes 10A and 12A. Associated with the neon tube B are the electrodes 10B and 12B. Associated with the tube C are the electrodes 10C and 12C. Associated with the tube D are the electrodes 10D and 12D.

Figure 5:
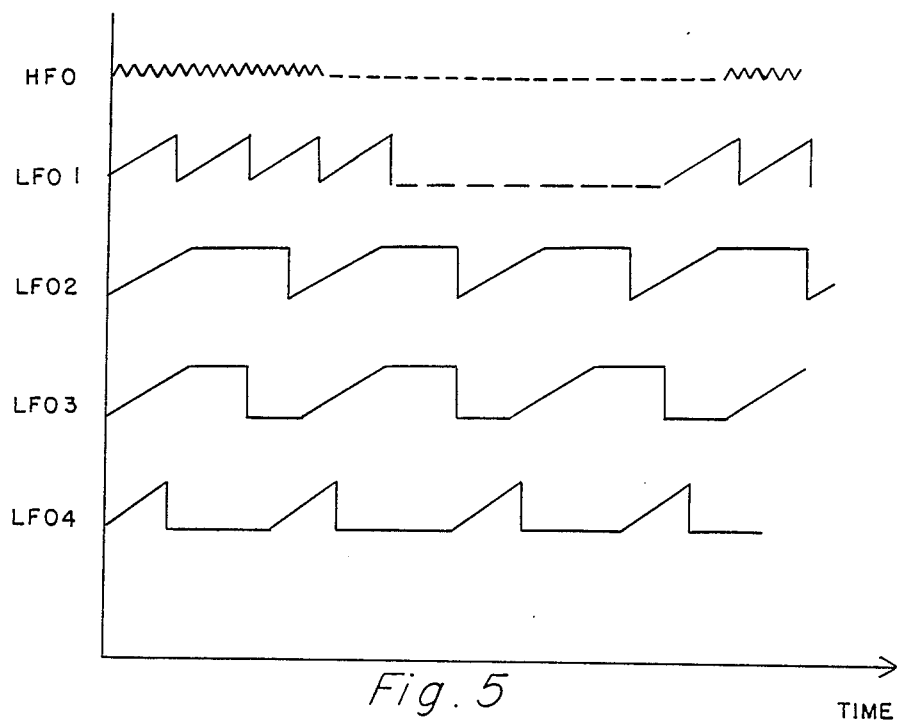
FIG. 5 shows various waveforms including the high frequency excitation waveforms and a series of low frequency control waveforms.

Each of the individual tubes illustrated in FIG. 1 are operated in a sweeping light intensity fashion from the electrode 10(A-D) to the electrode 12(A-D). In this connection, the electrode 10 always represents the starting point of light propagation for a particular tubing section and the electrode 12 represents the end point of light propagation for the same section. The individual tubings A-D are excited in sequence. Thus, the bottle is outlined first. Next, the abstract of the wine and the letter "W" is excited. This is followed by the excitation of the lettering "ine". This is then followed by the underlining. At that point in time, the entire sign is illuminated and may remain on for some predetermined period. At the end of this period, the entire sign may be switched off and the sequence may be repeated. Reference is made hereinafter to FIG. 5 for an illustration of different modes of control of sign excitation.

With further reference to FIG. 1, the different sections of tubing may be constructed by conventional neon sign fabrication techniques. The colors desired and the practicalities of glassbending dictate that in the particular example of FIG. 1, four separate lengths of glass are preferred. Tubing A may be a green colored bottle outline. Tubing B may be a rose colored abstract of wine in the bottle along with a bright letter "W". Tubing C may also be bright red lettering of "ine". The last tube D may be contrasting bright blue for the tail flourish.

Figure 3:
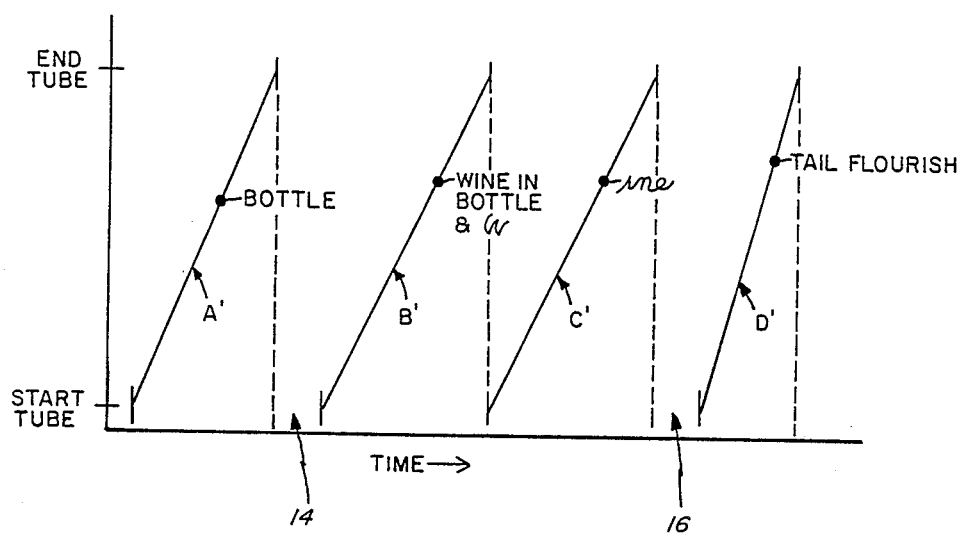
FIG. 3 is a timing diagram associated with FIGS. 1 and 2 and illustrating the operation of the individual tubes.

Reference is now made to the timing diagram of FIG. 3. This illustrates four separate curves associated with the four rare gas tubes of FIG. 1. Each of these linear curves is represented by a corresponding identification A', B', C', and D'. The slopes of the lines A'-D' denote the rate of light propagation in the related tube from start to finish. FIG. 3 clearly illustrates the relationship between excitation of successive tubes. It is noted that the end of the bottle tube A is followed by a pause at 14 before the wine in the bottle begins to fill (propagate). After the pause indicator 14 then the next tube is excited. Refer to line B' in FIG. 3. It is noted that the termination of line B' occurs concurrent with the start of excitation of the third tube. In this connection, refer to line C' in FIG. 3. The tail flourish begins propagation some period after the preceding tube has finished. This is indicated by the delay or pause at 16 in FIG. 3.

In FIG. 3 it is noted that the lines A', B', and C' all have the same slope and thus the sweep of these individual tubes occurs at the same rate. However, the linear curve D' in FIG. 3 indicates that the tail flourish slope is steeper than the others. This indicates that this last tube D has a faster light propagation rate than the other tubes.

In FIG. 3 the X-axis represents the real time operation of the entire sign. The overall sweep rate is a function of the effective sweep rate of the low frequency signal which is identified in FIG. 2 as the signal LFO but at the output of the ramp generator 20. The time base of this signal can be controlled by varying the potentiometer 22. In this connection, also refer to FIG. 5 and the signal LFO1. The circuitry, which is described hereinafter in further detail, in FIG. 2 operates so that a change in the base rate as set by the slope of the ramp of the output of circuit 20, will speed up or slow down each tube's propagation rate. However, even though the overall time base is altered the relative operation between individual tubes maintains the same relative timing patterns. This guarantees that for any overall rate of speed of sign operation, for example, the pauses at 14 and 16 in FIG. 3 are shortened or lengthened appropriately and the continuity of operation between lines B' and C' in FIG. 3 is maintained.

Figure 2:
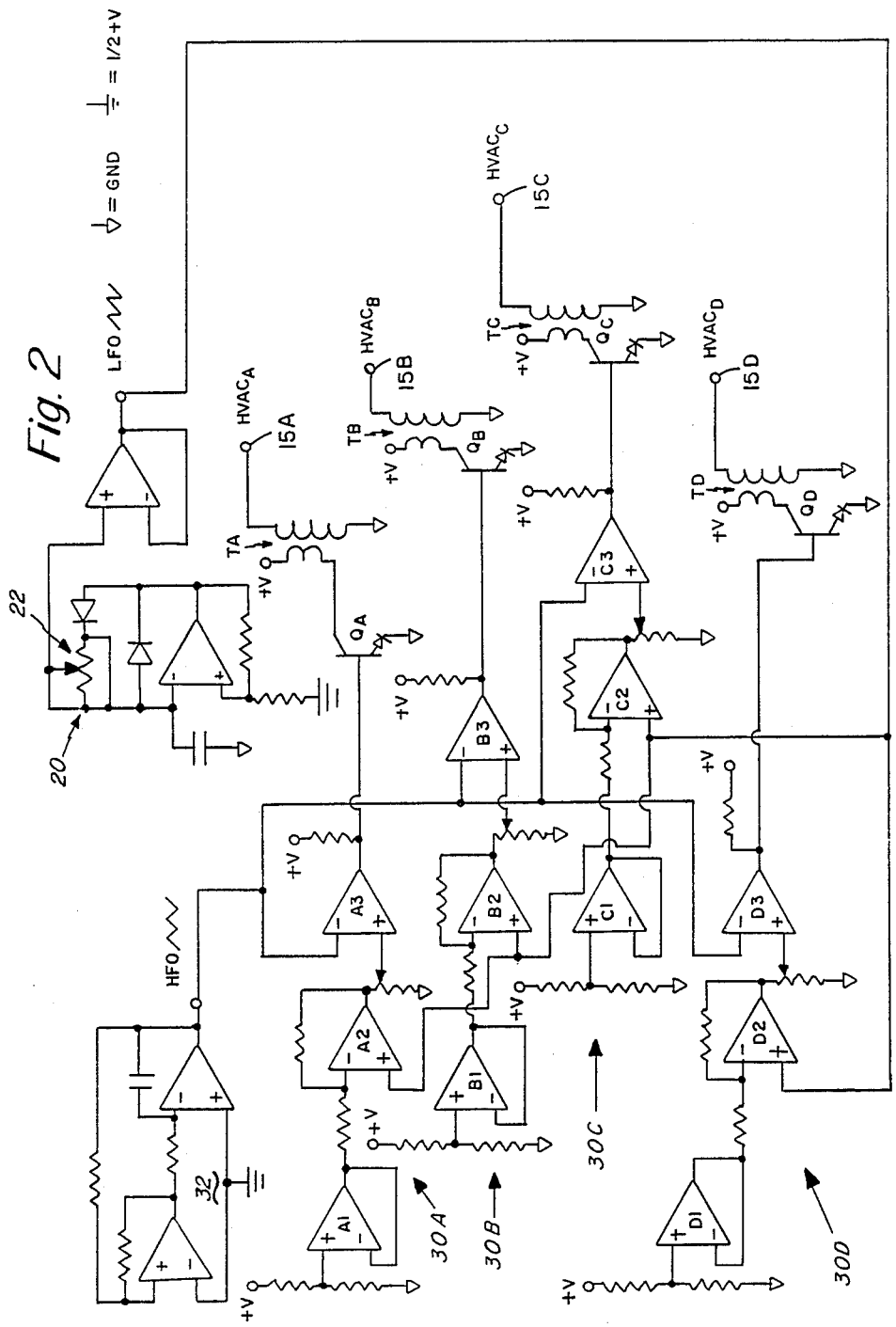
FIG. 2 is a circuit diagram illustrating a circuit that is employed in controlling the display.

Thus, with reference to FIGS. 1-3, there is disclosed a neon sign that is composed of multiple and separate glass sections or tubes that are to propagate light through the individual sections in a programmable mode of operation. The rate of light propagation in any one tube may be controlled so as to be faster or slower than the rates of other tubes. The length of light propagation in a tube can be longer or shorter than the length of propagation in other tubes depending upon the desired physical and/or aesthetic considerations. There may be a continous propagation from one tube to the next. Some tubes are designed, as far as the control thereof is concerned, to commence propagation after a pause or delay, or as described hereinafter in FIG. 6 excitation may occur prior to the completion of excitation in a previous tube. Also, as described hereinafter in connection with FIG. 5, there can be different modes of operation of the sign as far as the "on" and "off" sign states are concerned. The sign may be operated so as to remain in the "on" or "off" state for a user definable period before resuming its cycle.

Reference is now made to the circuit diagram of FIG. 2. This illustrates the control circuitry that is employed in connection with the excitation of the sign of FIG. 1. In this connection, the control circuitry may be considered as separated into four separate circuits identified in FIG. 2 as circuits 30A, 30B, 30C, and 30D. Each of these circuits receive signals from the ramp generator 20 as well as from the high frequency oscillator 32. Note in FIG. 2 that the oscillator 32 and the output signal HFO which is the high frequency oscillator signal used for driving the tubes. In FIG. 2 the output of each of the separate control circuits is at terminals 15A-15D. These output terminals couple respectively to the electrodes at 10A-10D in FIG. 1. Thus, each of these circuits drives an individual one of the display tubes. The other of the electrodes 12A-12D may be coupled to an appropriate circuit voltage.

In FIG. 2 there is an output drive section of each of the individual control circuits 30A-30D. This includes the high voltage transformers TA-TD and associated switching transistors QA-QD. This output drive circuitry provides the modulated voltage and current to each tube's starting electrode. Again, these appear at the output terminal as 15A-15D.

Each of the individual control circuits identified in FIG. 2 include a series of resistive networks and active devices. These devices provide for the proper DC offset, provide for signal combining, and furthermore provide for a comparison function, all to be described hereinafter.

In the control circuitry, there are four comparators A3-D3. These provide the respective pulse width modulation control signals to the switching transistors QA-QD. One input to each of the comparators is the high frequency oscillator triangular waveform. This is illustrated in FIG. 2 as the signal HFO coupled to the negation input of each of these comparators A3-D3. The other input to the comparators is the gain adjusted ramp voltage from the low frequency oscillator ramp generator 20. Thus, the signals HFO and LFO essentially combine in the devices A3-D3 to provide the pulse width modulation duty cycle value corresponding to the desired length of light propagation in a sign tube.

The signals for the insertion input of the devices A3-D3 are coupled from the devices A2-D2. Each of these devices combine a DC offset input at their negation input with the direct low frequency signal. This produces the desired ramp signal to the pulse width modulation comparators A3-D3. As the signal LFO rises a ramp signal, the devices A2-D2 are biased into linear operation as determined by the DC offset from the devices A1-D1. The point in time when the ramp signal LFO begins to turn on the switch transistors is determined by the voltage divider input to devices A1-D1. This voltage divider input is coupled to the assertion input of the devices A1-D1. The rate of change or slope, as depicted in FIG. 3, is determined by the gain of the devices A2-D2. This in turn is determined by the resistor network associated with the devices A2-D2.

The slopes of each of the signals as determined by the devices A2-D2 are locked to the signal LFO slope value by the gain of the devices A2-D2. Higher voltages at the input of the devices A1-D1 mean there is a later turn-on of the switching transistors. Thus, for example, the tail flourish display tube would have the highest offset voltage so that triggering did not occur until the ramp was near its peak and beyond other position where previous tubes were excited. Also, the higher the value of the feedback resistor associated with devices A2-D2, the steeper the ramp slopes when the devices A2-D2 are turned on. The potentiometer at the output of devices A2-D2 controls the length of light propagation through the tube. The ramp signal LFO controls the time base for the entire sign and adjusts the individually set slopes of the controllers for synchronized operation of the multiple tubes of the sign.

It is noted that in FIG. 2 that each of the circuits 30A-30D ar substantially identical except for the individual settings to control offset and slope. This similarity in circuits makes the system quite adaptable to modularization. The concatenation of controller modules offers substantial flexibility in design and implementation of the signmaker's task. The system may be tailored to meet a wide variety of different applications.

Figure 4:
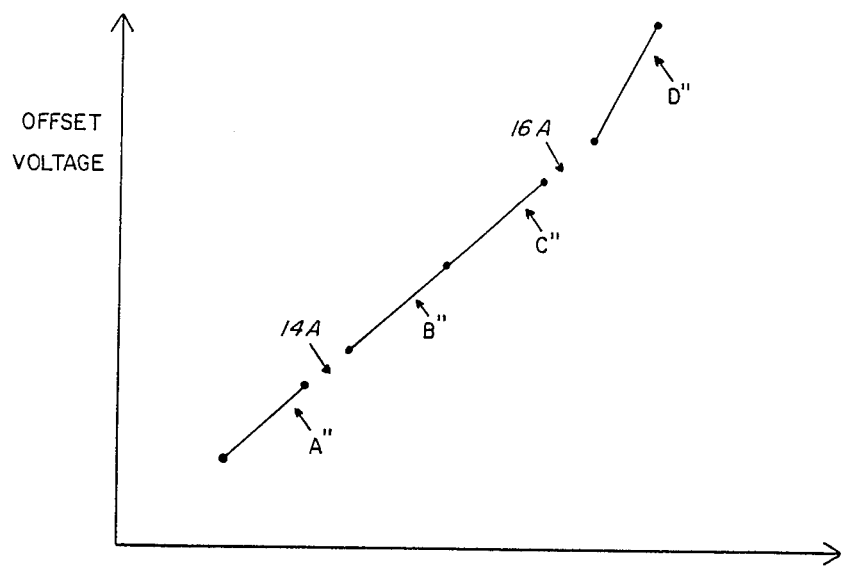
FIG. 4 is also a timing diagram similar to the diagram of FIG. 3 and relating the tube excitation to offset voltage.

Reference has been made hereinbefore to FIG. 3. In this connection also refer to FIG. 4. These two diagrams are similar except that FIG. 4 also illustrates the offset aspects of the control. This clearly illustrates that at a particular point in time the offset for tube A is such as to provide excitation along the slope illustrated in FIG. 4. This is illustrated at curve A''. FIG. 4 also shows the pause at 14A. There are then two concurrent segments B'' and C''. FIG. 4 also illustrates the different sloped segment at D''. Thus, each of the different tubes has a different offset threshold that prevents subsequent tubes from exciting until the previous tube has been excited. This, of course, assumes that the tubes are to be excited in some type of a sequence. In an alternate embodiment of the invention, different ones of the tubes could also be excited at the same time in which case there would be an overlap of lines in the illustration of FIG. 4.

Reference is also now made to FIG. 5. FIG. 5 shows the high frequency signal as signal HFO. FIG. 5 also shows a series of ramp generated signals LFO1-LFO4. The signal LFO1 is the one indicated as applied in FIG. 2. This simply provides for a continuous ramp that would cause successive excitation of the tube segment. At the top of the ramp, the sign would be completely illuminated. When the signal transitions back to zero reference then the sign would be extinguished and the cycle would continue again.

In the signal LFO2, the same ramping occurs so as to provide the sweeping action in successively exciting the sign. However, this is followed by a dwell period when the signal is at its high period indicating that the sign is maintained illuminated for that period of time. When the signal ends transitions to zero reference, the sign is extinguished.

The signal LFO3 indicates a cycle in which the sign is initially illuminated by the sweeping action, is then maintained illuminated and thereafter is maintained in an off state for some predetermined interval.

The final signal LFO4 again indicates the ramping to provide the sweeping action. Thereafter, the signal reverts to zero reference and thus the sign is extinguished for a period of time before the cycle repeats.

Figure 6:
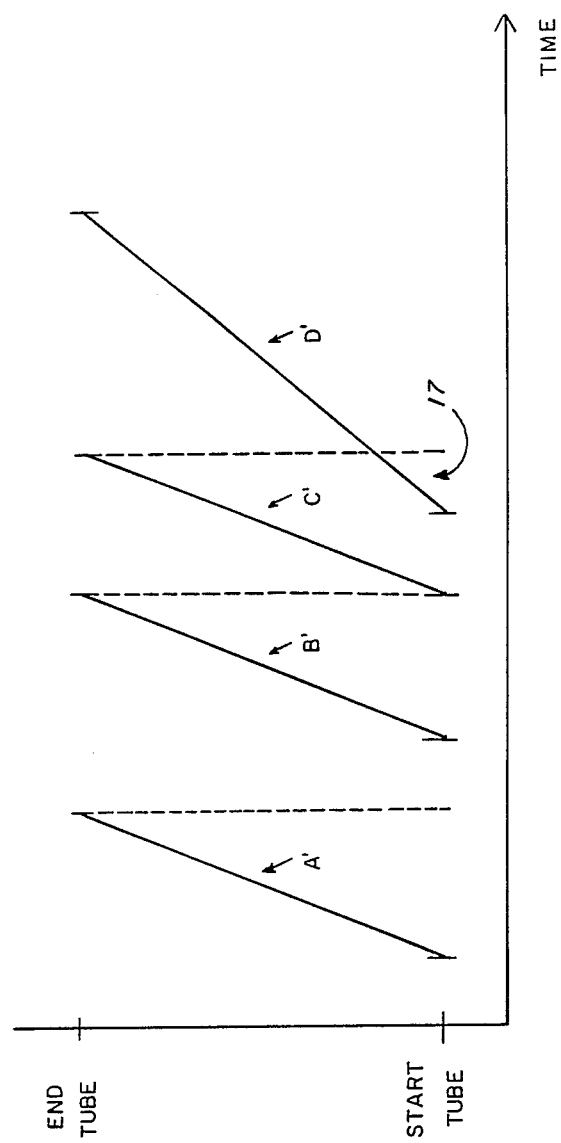
FIG. 6 is a timing diagram similar to FIG. 3 showing an alternate form of excitation.

Reference is also now made to FIG. 6. This illustrates a diagram quite similar to the timing diagram of FIG. 3. In FIG. 6 the lines A', B', and C' are substantially identical to those depicted in FIG. 3. However, the last line D' illustrates a slightly different mode of operation in which the last tube, namely the tail flourish, commences excitation prior to the completion of the sweep in the previous tube C. This is illustrated by the overlap at 17 in FIG. 6. Also note in FIG. 6 that the slope of the line D' is at a lower slope thus indicating that the tail flourish sweeps at a slower rate than in the embodiment illustrated in FIG. 3. Again, the slope as depicted in FIGS. 3 and 6 is set by setting the gain of the devices A2-D2 in FIG. 2.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A rare gas control system comprising; a first envelope means for containing an excitable rare gas and having a pair of electrodes disposed at opposite positions in said first envelope means, second envelope means for containing an excitable rare gas and having a pair of electrodes disposed at opposite positions in said second envelope means, and control means including first means for controlling excitation of one of said electrodes of said first envelope means at a variable increasing power level to cause light intensity to sweep from said one electrode toward the other electrode and commencing at a first predetermined control point, second means for controlling excitation of one of said electrodes of said second envelope means at a variable increasing power level to cause light intensity to sweep from said one electrode toward the other electrode and commencing at a second predetermined control point, and means for providing a control signal commonly coupled to said first and second means for controlling initiation of excitation of said envelope means at said respective predetermined control points.

2. A system as set forth in claim 1 wherein said control means includes means for controlling initiation of the excitation of said second envelope means only after a delay period commencing with completion of the excitation, and thus the light sweep action, of the first envelope means.

3. A system as set forth in claim 2 including means for controlling separately at each envelope means the rate of excitation and thus the rate of the light intensity sweep.

4. A system as set forth in claim 3 including controlling the rate of excitation at different rates in the respective first and second envelope means.

5. A system as set forth in claim 4 further including third envelope means for containing an excitable rare gas and having a pair of electrodes disposed at opposite positions in said third envelope means.

6. A system as set forth in claim 5 wherein said control means further includes third control means for controlling excitation of one of said electrodes of said third envelope means at a variable increasing power level to cause light intensity to sweep from said one electrode toward the other electrode.

7. A system as set forth in claim 6 wherein said control means includes means for controlling initiation of the excitation of said third envelope means directly upon completion of the excitation, and thus the light sweep action, of the second envelope means.

8. A system as set forth in claim further including third envelope means for containing an excitable rare gas and having a pair of electrodes disposed at opposite positions in said third envelope means.

9. A system as set forth in claim 8 wherein said control means further includes third control means for controlling excitation of one of said electrodes of said third envelope means at a variable increasing power level to cause light intensity to sweep from said one electrode toward the other electrode.

10. A system as set forth in claim 9 wherein said control means includes means for controlling initiation of the excitation of said third envelope means directly upon completion of the excitation, and thus the light sweep action, of the second envelope means.

11. A system as set forth in claim 1 wherein said control means includes means for controlling initiation of the excitation of said second envelope means directly upon completion of the excitation, and thus the light sweep action, of the first envelope means.

12. A system as set forth in claim 1 wherein said envelope means each comprise a rare gas tue.

13. A system as set forth in claim 12 wherein each rare gas tube is configured into display indicia.

14. A system as set forth in claim 13 wherein each rare gas tube has an elongated configured shape with the pair of electrodes disposed at opposite ends thereof.

15. A system as set forth in claim 1 wherein each of said first and second control means comprise a control circuit including first circuit means having a pair of inputs and an output, said output connected to drive an envelope means, means defining a high frequency signal coupled to one input of the first circuit means, and means for providing a variable ramp signal coupled to the other input of the first circuit means.

16. A system as set forth in claim 15 wherein said control circuit further comprises second circuit means for providing said variable ramp signal, said second circuit means including a combining circuit for combining the variable ramp signal with an offset signal.

17. A system as set forth in claim 16 further including a third circuit means for providing said offset signal.

18. A system as set forth in claim 17 wherein the offset signal is different for each envelope means so as to provide sequential sweeping in each envelope means.

19. A system as set forth in claim 1 wherein said first and second means each include circuit means of like form adaptable to being modularized.

20. A rare gas control system comprising; a first envelope means for containing an excitable rare gas and having a pair of electrodes disposed at opposite positions in said first envelope means, second envelope means for containing an excitable rare gas and having a pair of electrodes disposed at opposite positions in said second envelope means, and control means including first control means for controlling excitation of one of said electrodes of said first envelope means at a variable increasing power level to cause light intensity to sweep from said one electrode toward the other electrode, and second control means for controlling excitation of one of said electrodes of said second envelope means at a variable increasing power level to cause light intensity to sweep from said one electrode toward the other electrode, said control means further including means for controlling separately at each envelope means the rate of excitation and thus the rate of the light intensity sweep.

21. A system as set forth in claim 20 including controlling the rate of excitation at different rates in the respective first and second envelope means.

22. A method of controlling a pair of rare gas tubes each containing an excitable rare gas and a pair of electrodes disposed at opposite positions in each tube, said method comprising the steps of, controlling excitation of one of the electrodes of a first tube at a variable increasing power level to cause light intensity to sweep from the one electrode toward the other electrode, controlling excitation of one of the electrodes of a second tube at a variable increasing power level to cause light intensity to sweep from said one electrode toward the other electrode and providing a single control signal commonly coupled to said first and second tubes for selectively controlling the initiation of excitation of said tubes in a predetermined sequential pattern.

23. A method as set forth in claim 22 including controlling initiation of the excitation of the second tube only after a delay period commencing with completion of the excitation, and thus the light sweep action, of the first tube.

24. A method as set forth in claim 23 including controlling separately at each tube the rate of excitation and thus the rate of light intensity sweep.

25. A method as set forth in claim 22 including controlling initiation of the excitation of the second tube directly upon completion of the excitation, and thus the light sweep action, of the first tube.

26. A method as set forth in claim 22 including controlling initiation of the excitation of the second tube prior to completion of the excitation, and thus the light sweep action, of the first tube.

27. A method of controlling a pair of rare gas tubes each containing an excitable rare gas and a pair of electrodes disposed at opposite positions in each tube, said method comprising the steps of, controlling excitation of one of the electrodes of a first tube at a variable increasing power level to cause light intensity to sweep from the one electrode toward the other electrode, and controlling excitation of one of the electrodes of a second tube at a variable increasing power level to cause light intensity to sweep from said one electrode toward the other electrode, wherein the step of controlling excitation of the second tube includes controlling initiation of the excitation of the second tube prior to completion of the excitation, and thus the light sweep action, of the first tube.

28. A circuit for controlling the excitation of at least first and second rare gas tubes each containing an excitable rare gas and having a pair of electrodes disposed at opposite positions therein, said circuit comprising, a first circuit means generating a ramp signal for controlling said first tube and a second circuit means, independent of said first circuit means, for controlling said second tube, said first and second circuit means each including a first circuit device having a pair of inputs and an output, said output connected to drive a tube, means defining a high frequency signal coupled to one input of the circuit means and means for providing a variable ramp signal coupled to the other input of the first circuit means.

29. A circuit as set forth in claim 28 wherein said control circuit further comprises second circuit means for providing said variable ramp signal, said second circuit means including a combining circuit for combining the variable ramp signal with an offset signal.

30. A circuit as set forth in claim 29 further including a third circuit means for providing said offset signal.

31. A circuit as set forth in claim 30 wherein the offset signal is different for each envelope means so as to provide sequential sweeping in each envelope means.

32. A rare gas control system comprising; a first envelope means for containing an excitable rare gas and having a pair of electrodes disposed at opposite positions in said first envelope means, second envelope means for containing an excitable rare gas and having a pair of electrodes disposed at opposite positions in said second envelope means, and control means including first control means for controlling excitation of one of said electrodes of said first envelope means at a variable increasing power level to cause light intensity to sweep from said one electrode toward the other electrode, and second control means for controlling excitation of one of said electrodes of said second envelope means at a variable increasing power level to cause light intensity to sweep from said one electrode toward the other electrode, said control means further including means for controlling initiation of the excitation of said second envelope means only after a delay period commencing with completion of the excitation, and thus the light sweep action, of the first envelope means.

33. A system set forth in claim 32 including means for controlling separately at each envelope means the rate of excitation and thus the rate of the light intensity sweep.

34. A system set forth in claim 33 including controlling the rate of excitation at different rates in the respective first and second envelope means.

35. A system as set forth in claim 34 further including third envelope means for containing an excitable rare gas and having a pair of electrodes disposed at opposite positions in said third envelope means.

36. A system as set forth in claim 35 wherein said control means further includes third control means for controlling excitation of one of said electrodes of said third envelope means at a variable increasing power level to cause light intensity to sweep from said one electrode toward the other electrode.

37. A system set forth in claim 36 wherein said control means includes means for controlling initiation of the excitation of said third envelope means directly upon completion of the excitation, and thus the light sweep action, of the second envelope means.

38. A rare gas control system comprising; a first envelope means for containing an excitable rare gas and having a pair of electrodes disposed at opposite positions in said first envelope means, second envelope means for containing an excitable rare gas and having a pair of electrodes disposed at opposite positions in said second envelope means, and control means including first control means for controlling excitation of one of said electrodes of said first envelope means at a variable increasing power level to cause light intensity to sweep from said one electrode toward the other electrode, and second control means for controlling excitation of one of said electrodes of said second envelope means at a variable increasing power level to cause light intensity to sweep from said one electrode toward the other electrode, each of said first and second control means comprising a control circuit including first circuit means having a pair of inputs and an output, said output connected to drive an envelope means, means defining a high frequency signal coupled to one input of the first circuit means, and means for providing a variable ramp signal coupled to the other input of the first circuit means.

39. A system as set forth in claim 38 wherein said control circuit further comprises second circuit means for providing said variable ramp signal, said second circuit means including a combining circuit for combining the variable ramp signal with an offset signal.

40. A system as set forth in claim 39 further including a third circuit means for providing said offset signal.

41. A system as set forth in claim 40 wherein the offset signal is different for each envelope means so as to provide sequential sweeping in each envelope means.

42. A method of controlling a pair of rare gas tubes each containing an excitable rare gas and a pair of electrodes disposed at opposite positions in each tube, said method comprising the steps of, controlling excitation of one of the electrodes of a first tube at a variable increasing power level to cause light intensity to sweep from the one electrode toward the other electrode, and controlling excitation of one of the electrodes of a second tube at a variable increasing power level to cause light intensity to sweep from said one electrode toward the other electrode, the step of controlling excitation of the second tube including controlling initiation of the excitation of the second tube only after a delay period commencing with completion of the excitation, and thus the light sweep action, of the first tube.

43. A method as set forth in claim 42 including controlling separately at each tube the rate of excitation and thus the rate of light intensity sweep.

* * * * *